US011082536B2

(12) United States Patent
Schultz

(10) Patent No.: US 11,082,536 B2
(45) Date of Patent: Aug. 3, 2021

(54) MOBILE ANNOUNCEMENT SYSTEM

(71) Applicant: Jeffrey T. Schultz, Broomfield, CO (US)

(72) Inventor: Jeffrey T. Schultz, Broomfield, CO (US)

( * ) Notice: Subject to any disclaimer, the term of this patent is extended or adjusted under 35 U.S.C. 154(b) by 0 days.

(21) Appl. No.: 16/659,252

(22) Filed: Oct. 21, 2019

(65) Prior Publication Data

US 2020/0137198 A1 Apr. 30, 2020

Related U.S. Application Data

(60) Provisional application No. 62/891,663, filed on Aug. 26, 2019, provisional application No. 62/750,054, filed on Oct. 24, 2018.

(51) Int. Cl.
*H04L 29/06* (2006.01)
*H04L 29/08* (2006.01)
*H04L 9/32* (2006.01)

(52) U.S. Cl.
CPC .......... *H04L 67/42* (2013.01); *H04L 9/3226* (2013.01); *H04L 63/08* (2013.01); *H04L 63/102* (2013.01); *H04L 63/107* (2013.01); *H04L 67/02* (2013.01); *H04L 67/10* (2013.01); *H04L 67/306* (2013.01)

(58) Field of Classification Search
CPC ..... H04L 9/3226; H04L 63/08; H04L 63/102; H04L 63/107; H04L 63/108; H04L 65/4084; H04L 67/02; H04L 67/04; H04L 67/10; H04L 67/18; H04L 67/306; H04L 67/42; Y04S 40/20
See application file for complete search history.

(56) References Cited

U.S. PATENT DOCUMENTS

| 5,132,666 | A | 7/1992 | Fahs | |
|---|---|---|---|---|
| 7,054,945 | B2* | 5/2006 | Hurtta | H04L 67/14 709/230 |
| 8,300,104 | B2* | 10/2012 | Lin | G08G 1/127 348/207.99 |
| 8,340,272 | B2* | 12/2012 | Knaz | H04W 4/16 379/211.02 |
| 9,538,011 | B1* | 1/2017 | Sherman | H04R 5/04 |
| 2004/0027996 | A1 | 2/2004 | Birdwell et al. | |
| 2004/0247093 | A1 | 12/2004 | Potts et al. | |
| 2006/0223494 | A1 | 10/2006 | Chmaytelli et al. | |

(Continued)

OTHER PUBLICATIONS

PCT International Patent Application No. PCT/US19/57595; International Search Report and Written Opinion of the International Searching Authority dated Jan. 17, 2020, 10 pages.

*Primary Examiner* — Thomas J Dailey
(74) *Attorney, Agent, or Firm* — Craig R. Miles; CR Miles P.C.

(57) ABSTRACT

A mobile announcement system distributed on one or more servers operably coupled to one or more client computing devices and one or more service provider computing devices and one or more mobile announcement devices by a public network which supports a mobile announcement program accessible by browser based on-line processing or downloadable by the client computing devices or the service provider computing devices to establish on-line or off-line wired or wireless connection with one or more mobile announcement devices which operate based on pre-selected announcement conditions to make visual or audio announcements.

12 Claims, 12 Drawing Sheets

(56) References Cited

U.S. PATENT DOCUMENTS

| | | | |
|---|---|---|---|
| 2010/0215187 A1* | 8/2010 | Moosavi | H04W 24/02 381/82 |
| 2015/0124995 A1* | 5/2015 | Defnet | H04R 27/00 381/82 |
| 2016/0171982 A1 | 6/2016 | Kore et al. | |
| 2018/0097856 A1* | 4/2018 | Dange | H04L 67/10 |

* cited by examiner

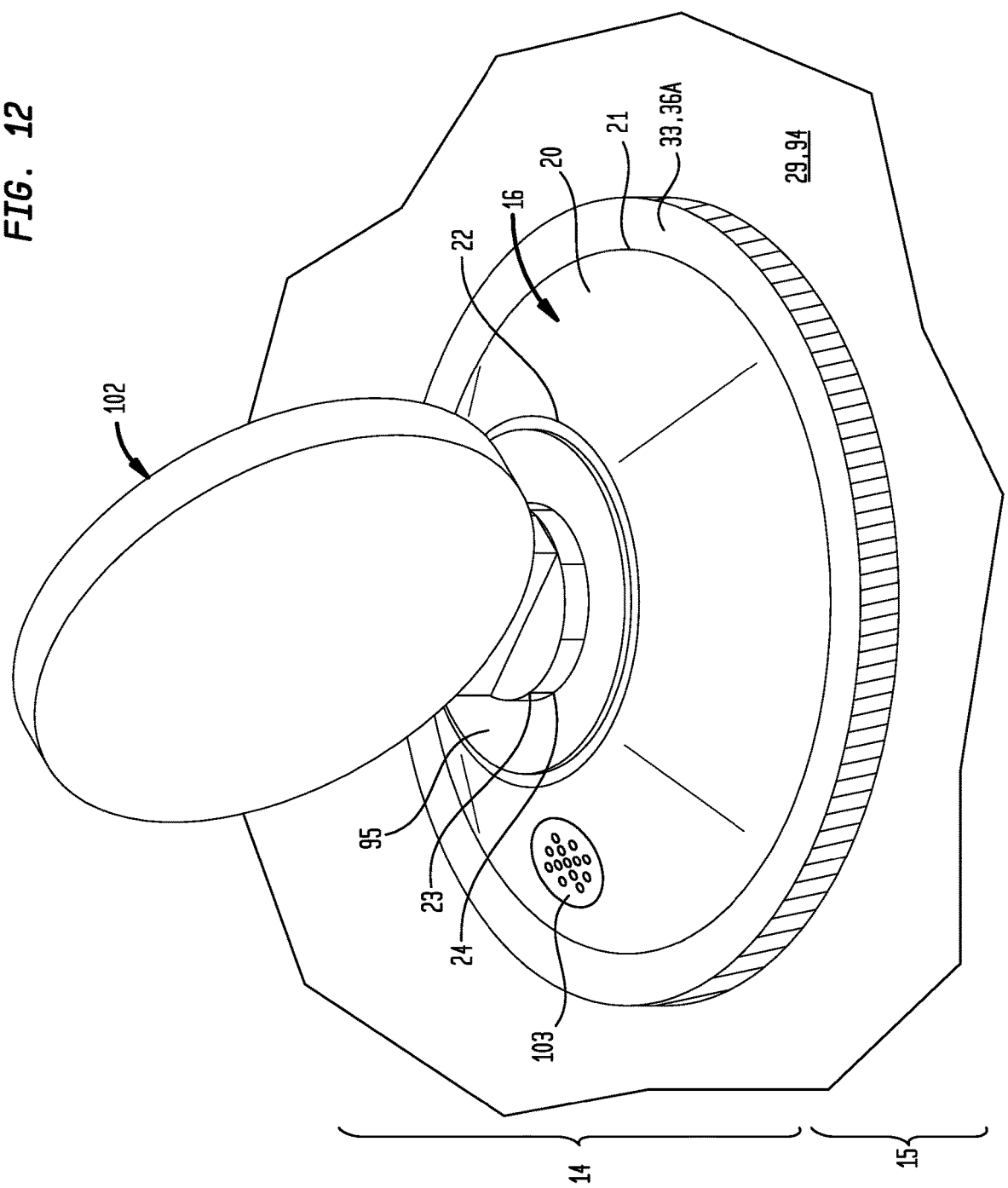

US 11,082,536 B2

MOBILE ANNOUNCEMENT SYSTEM

This United States Non-Provisional Patent Application claims the benefit of U.S. Provisional Patent Application No. 62/891,663, filed Aug. 26, 2019, and U.S. Provisional Patent Application No. 62/750,054, filed Oct. 24, 2018, each hereby incorporated by reference herein.

FIELD OF INVENTION

A mobile announcement system comprising one or more mobile announcement devices each including one or more mobile announcement device toppers removably engageable with a mobile announcement device base unit which receives and processes announcement data to generate announcements.

SUMMARY OF THE INVENTION

A broad object of particular embodiments can be to provide a mobile announcement system distributed on one or more servers operably coupled to one or more client computing devices or one or more service provider computing devices and one or more mobile announcement devices by a public network which supports a mobile announcement program accessible by browser based on-line processing or downloadable by the client computing devices or the service provider computing devices to establish on-line or off-line wired or wireless connection with one or more mobile announcement devices which operate based on pre-selected announcement conditions to make announcements including visual content or audio content, or combinations thereof.

Another broad object of particular embodiments of the invention can be to provide a mobile announcement device which can be disposed on a fixed support surface or on a mobile support surface and includes one or more mobile announcement device toppers removably engageable with a mobile announcement device base unit which receives and processes announcement data from a live visual data stream or a live audio data stream or retrieved from an announcement database to make announcements including visual content or audio content, or combinations thereof.

Another broad object of particular embodiments of the invention can be to provide a service computing device having a service provider processor communicatively coupled with a non-transitory computer readable media containing an announcement program executable to communicatively connect the service provider computing device with a client computing device or a mobile announcement device to program the mobile announcement device to receive or retrieve announcement data (whether visual announcement data or audio announcement data, or combinations thereof) from an announcement database to generate announcements including visual content or audio content, or combinations thereof.

Another broad object of particular embodiments of the invention can be to provide client computing device having a client processor communicatively coupled with a non-transitory computer readable media containing an announcement program executable to communicatively connect the client computing device with a service provider computing device or a mobile announcement device to program the mobile announcement device to receive or retrieve announcement data (whether visual announcement data or audio announcement data, or combinations thereof) from an announcement database to generate announcements including visual announcements or audio announcements, or combinations thereof.

Naturally, further objects of the invention are disclosed throughout other areas of the specification, drawings, photographs, and claims.

A BRIEF DESCRIPTION OF THE DRAWINGS

FIG. 12 is perspective view of a particular embodiment of a mobile announcement device.

DETAILED DESCRIPTION OF THE PREFERRED EMBODIMENTS

Figure 1:
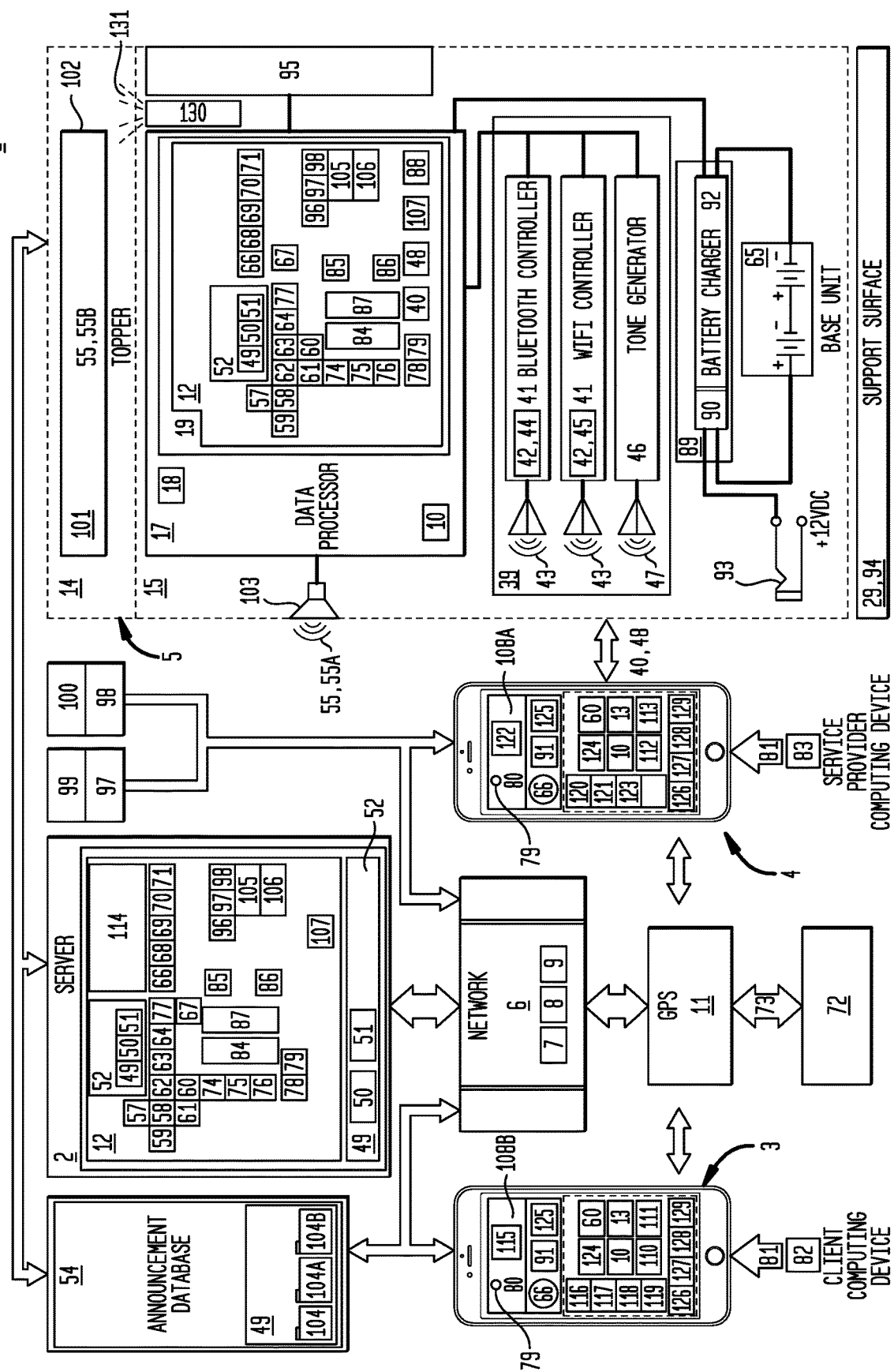
FIG. 1 is a block diagram of an illustrative computer means, network means and computer-readable media which provides computer-executable instructions to implement an embodiment of a mobile announcement system.

The System. Generally, with primary reference to FIGS. 1 through 12, a mobile announcement system (1) (also referred to as the "system (1)") can be distributed on one or more servers (2) operably coupled to one or more client computing devices (3) or one or more service provider computing devices (4)(or operably coupled to both the client computing devices and the service provider computing devices) and one or more mobile announcement devices (5) by a public network (6), such as the Internet (7), a cellular-based wireless network(s) (8), or a local network (9) (individually or collectively the "network"). Each client computing device (3) and each service provider computing device (4) and each of the one or more mobile announcement devices (6) can further include a global positioning receiver (10) operably coupled to a global positioning system ("GPS") (11). While the terms "client computing device" and "service provider computing device" are utilized in association with certain embodiments, this is not intended to limit the scope of the invention to those particular embodiments, rather certain embodiments may generically include a first computing device (3) or a second computing device (4) or both operably coupled as above described.

The network (6) supports an announcement program (12) (also referred to as the "program") accessible by browser based on-line processing or downloadable by the client computing devices (3) or the service provider computing devices (4). The program (12) coordinates communication between one or more service provider computing devices (4) or one or more client computing devices (3) to establish on-line or off-line wired or wireless connection with one or more mobile announcement devices (5).

The Mobile Announcement Device. Again, with general reference to FIGS. 1 through 12, embodiments of the mobile announcement device (5) include individually or in combination a mobile announcement device topper (14) (also referred to as "a topper") removably engageable with a mobile announcement device base unit (15) (also referred to as "a base unit").

The Base Unit. Embodiments of the base unit (15) a processor unit (17) including a processor (18) communicatively coupled to a non-transitory computer readable media (19) containing all or a portion of the program (12) coupled to a support housing (16). In particular embodiments a topper or a plurality of interchangeable toppers (14) can be removably coupled to the base unit (15); although in particular embodiments, the base unit (15) can be utilized without the topper (14).

Now referring primarily to FIGS. 2 through 11, a particular embodiment of the support housing (16) can include a support housing sidewall (20) disposed between a support housing base (21) opposite, or generally coplanar, with a coupler platform (22) including a first connector (23) which detachably mates with a second connector (24) coupled to the topper (14). In particular embodiments, the support housing side wall (20) can afford a continuous unbroken surface disposed between the support housing base (21) and the coupler platform (22). As illustrative examples, the support housing base (21) can be configured as truncated spheres, cones, or pyramids (three sided, four sided, five sided, six sided truncated pyramids, or a greater number of sides), or in any support housing configuration which can support or be coupled to the topper (14). In particular embodiments the support housing sidewall (20) can include a one-piece support housing sidewall (20).

As shown in the illustrative examples of FIGS. 2 through 11, the support housing sidewall (20) can comprise a first polygonal member (25) and a second polygonal member (26) disposed in generally opposed or coplanar opposed relation a distance apart by supporting pillars (27) extending between corresponding points of the polygonal members (25)(26), thereby defining a annular trapezoidal member having a sidewall aperture (28). The first polygon member (25) can have a lesser length and support the coupler platform (22) and the second polygonal member (26) can have a greater length, which when disposed on a support surface (29) stably supports the topper (14) releasably coupled by the first connector (23) of the topper (14) to the second connector (24) of the base unit (15).

Figure 2:
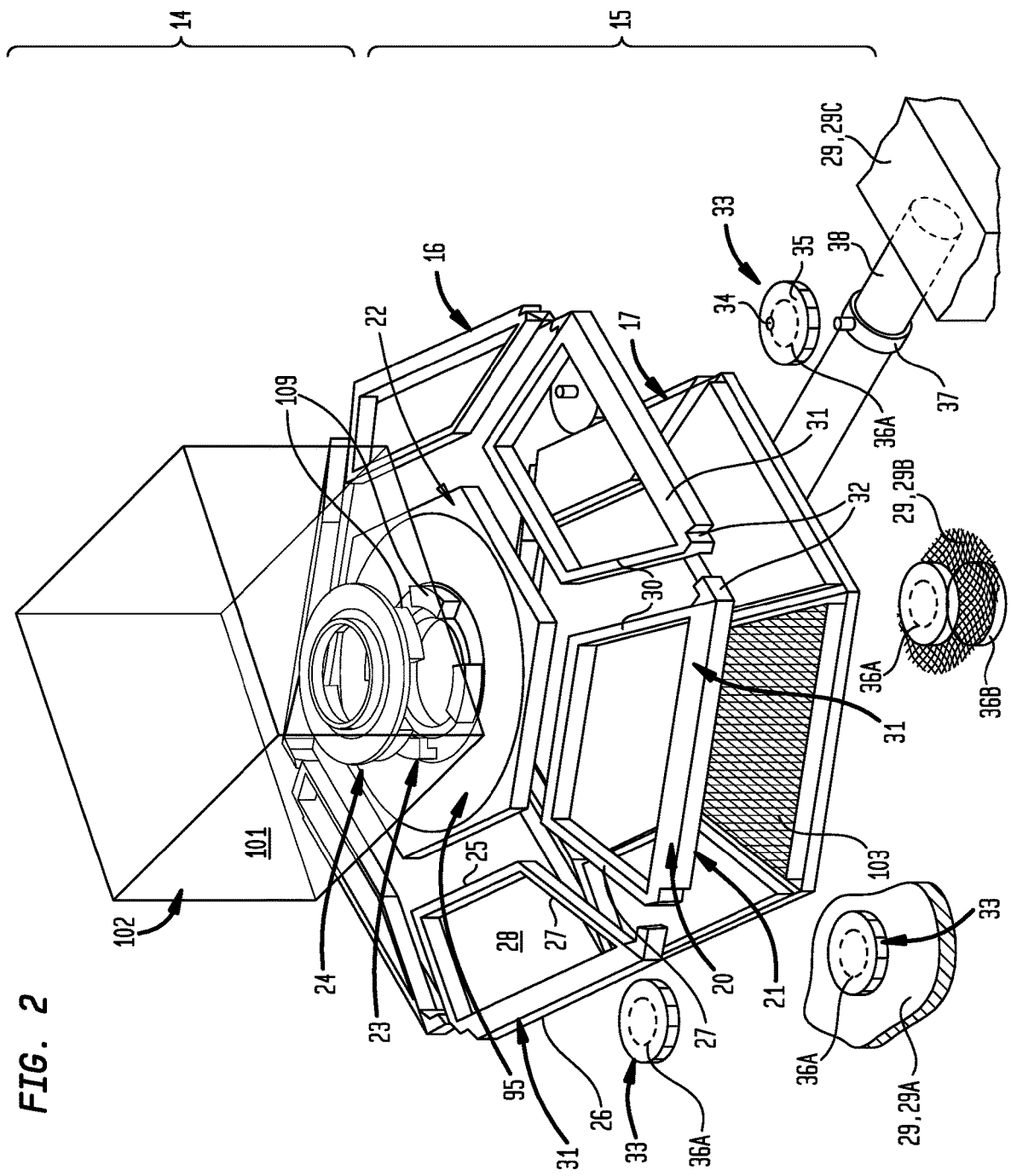
FIG. 2 is an exploded top perspective view of a particular embodiment of a mobile announcement device.

Now, with primary reference to FIG. 2, in particular embodiments, a plurality of trapezoidal members (31) can be assembled by interconnecting the non-parallel sides (3) to produce the support housing sidewall (20). Each of the non-parallel sides (30) of the plurality of trapezoidal members (31) can further include releasable interlocking features (32), such as: dovetail, mortise and tenon, g joints, spoke and hub, or other mateably detachable interference or snap fit elements. In particular embodiments, the interlocking features (32) upon mateable engagement remain permanently or removably affixed, or can be permanently affixed by application of an adhesive or fastener elements.

Figure 3:
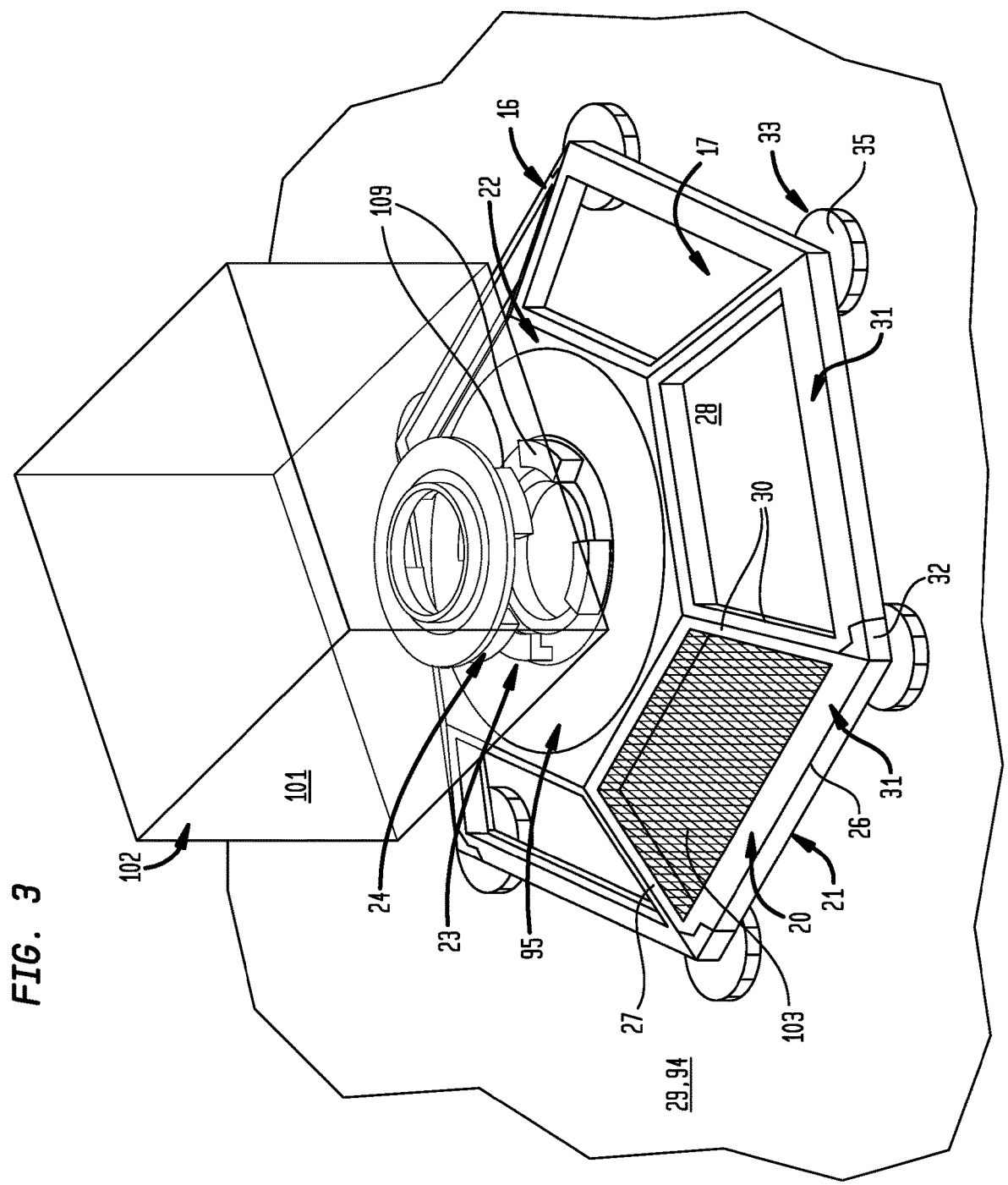
FIG. 3 is a top perspective view of a particular embodiment of a mobile announcement device.
Figure 4:
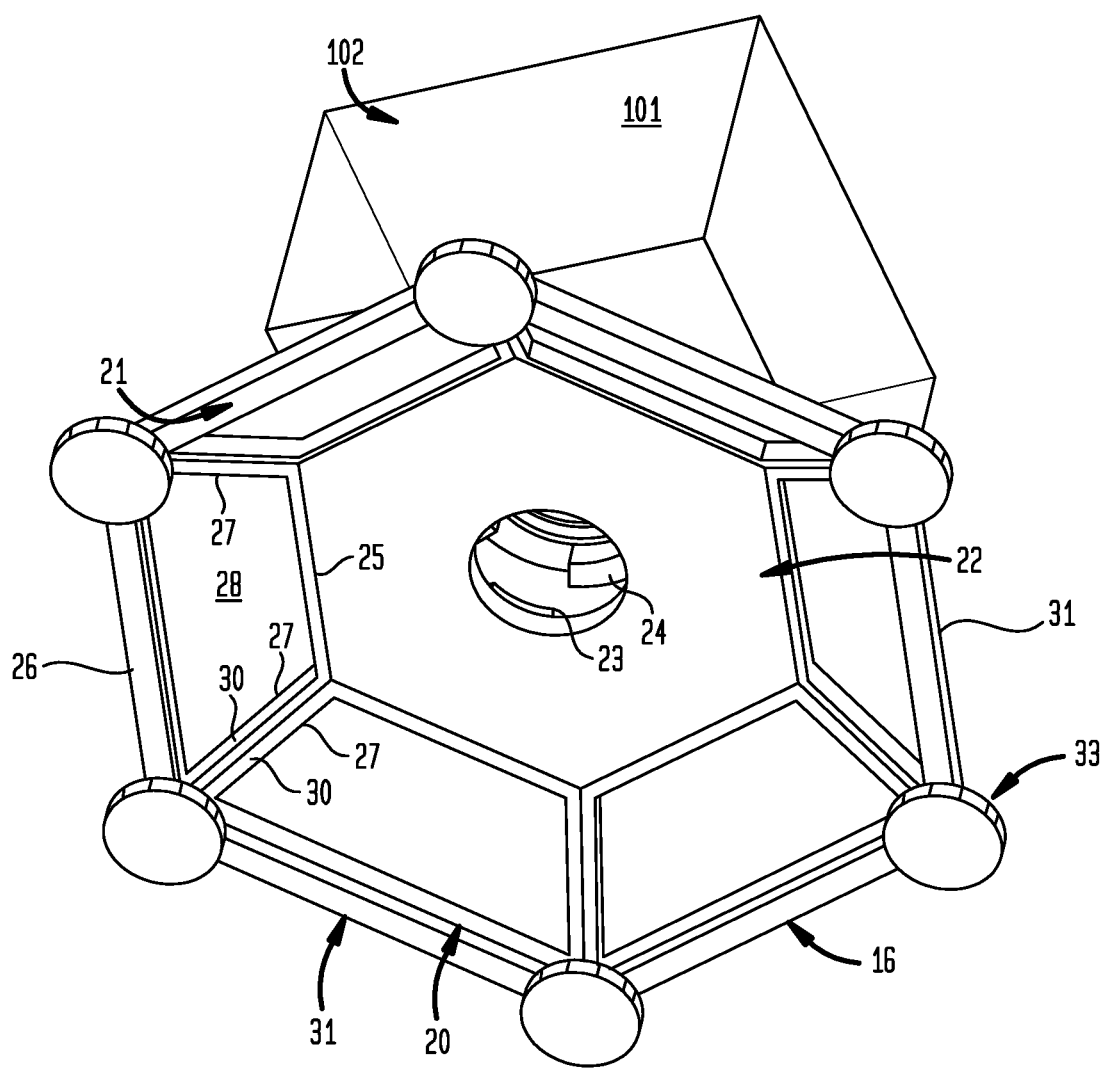
FIG. 4 is a bottom perspective view of a particular embodiment of a mobile announcement device.
Figure 5:
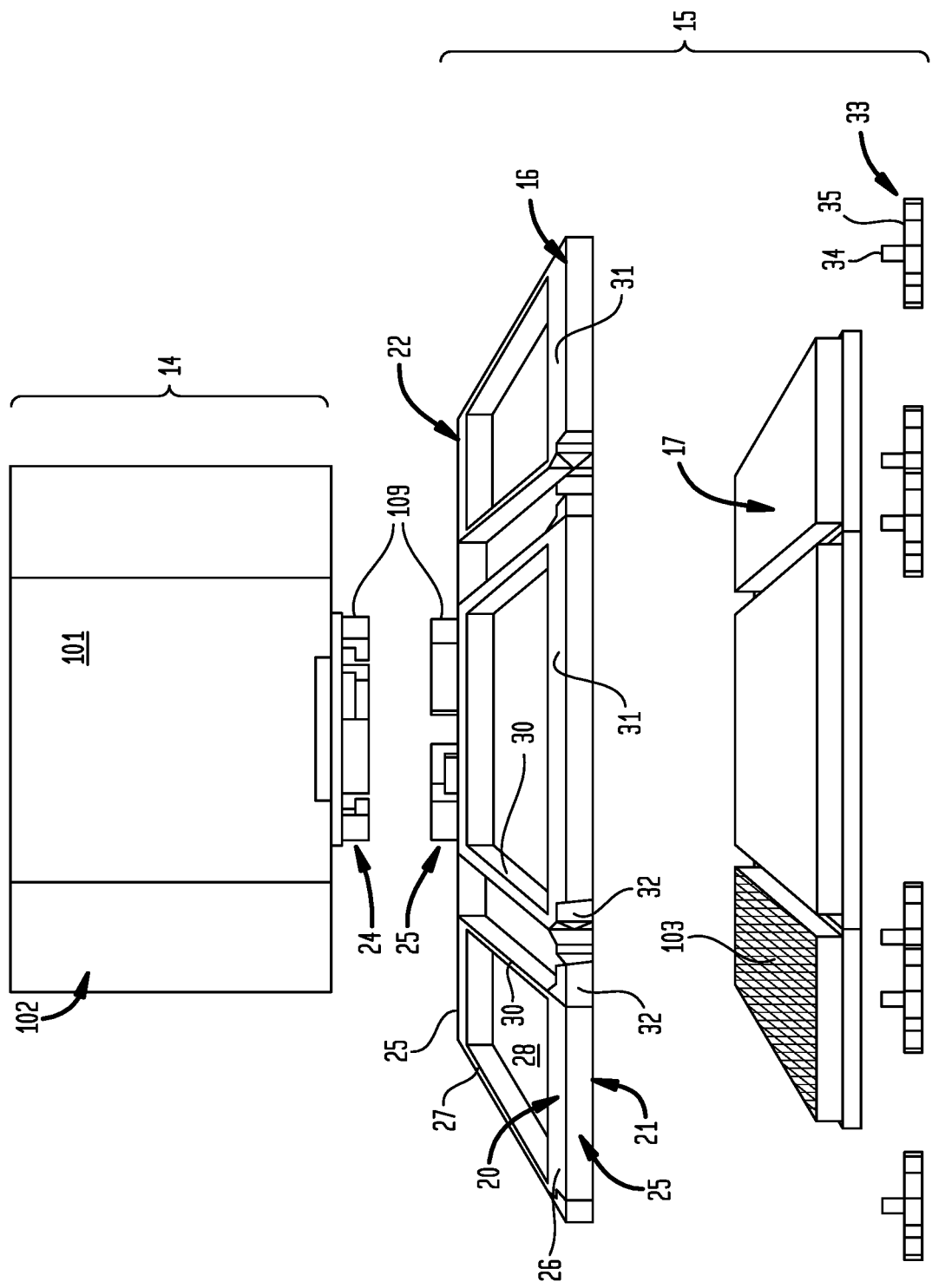
FIG. 5 is an exploded front elevation view of a particular embodiment of a mobile announcement device.
Figure 6:
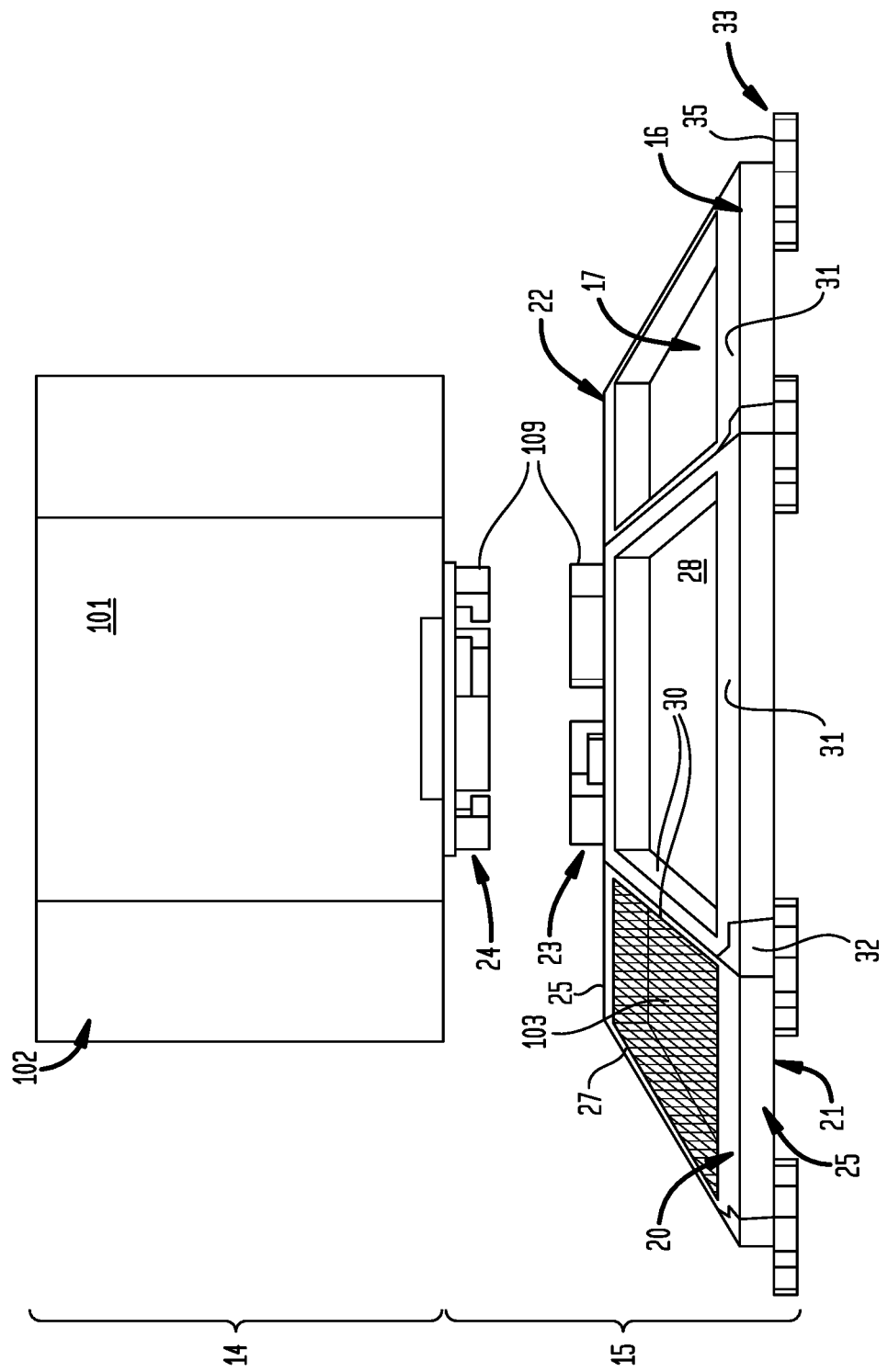
FIG. 6 is front elevation view of a particular embodiment of a mobile announcement device illustrating a mobile announcement device topper removably engageable with a mobile announcement device base unit.
Figure 7:
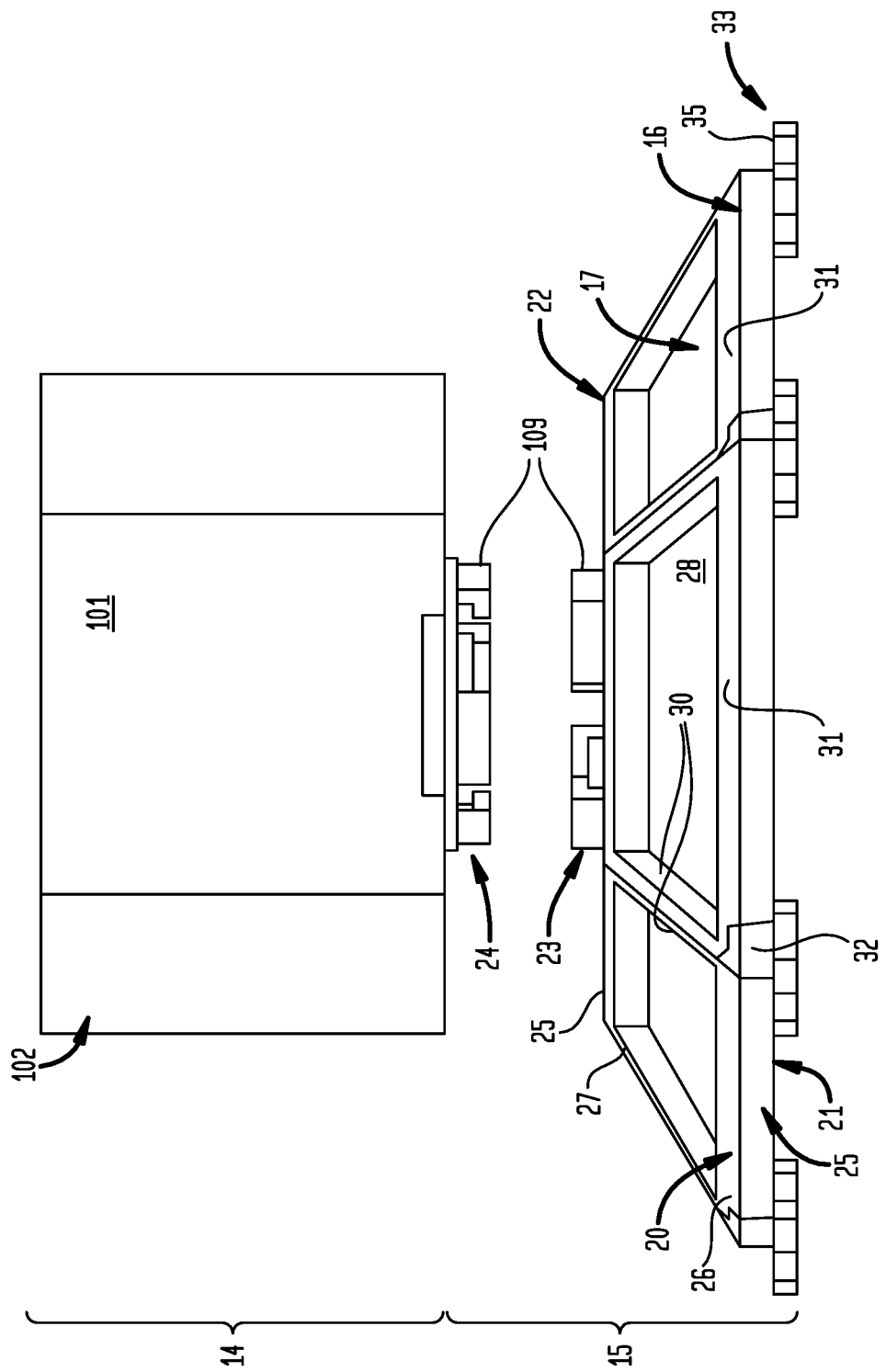
FIG. 7 is a rear elevation view of a particular embodiment of a mobile announcement device illustrating a mobile announcement device topper removably engageable with a mobile announcement device base unit.
Figure 8:
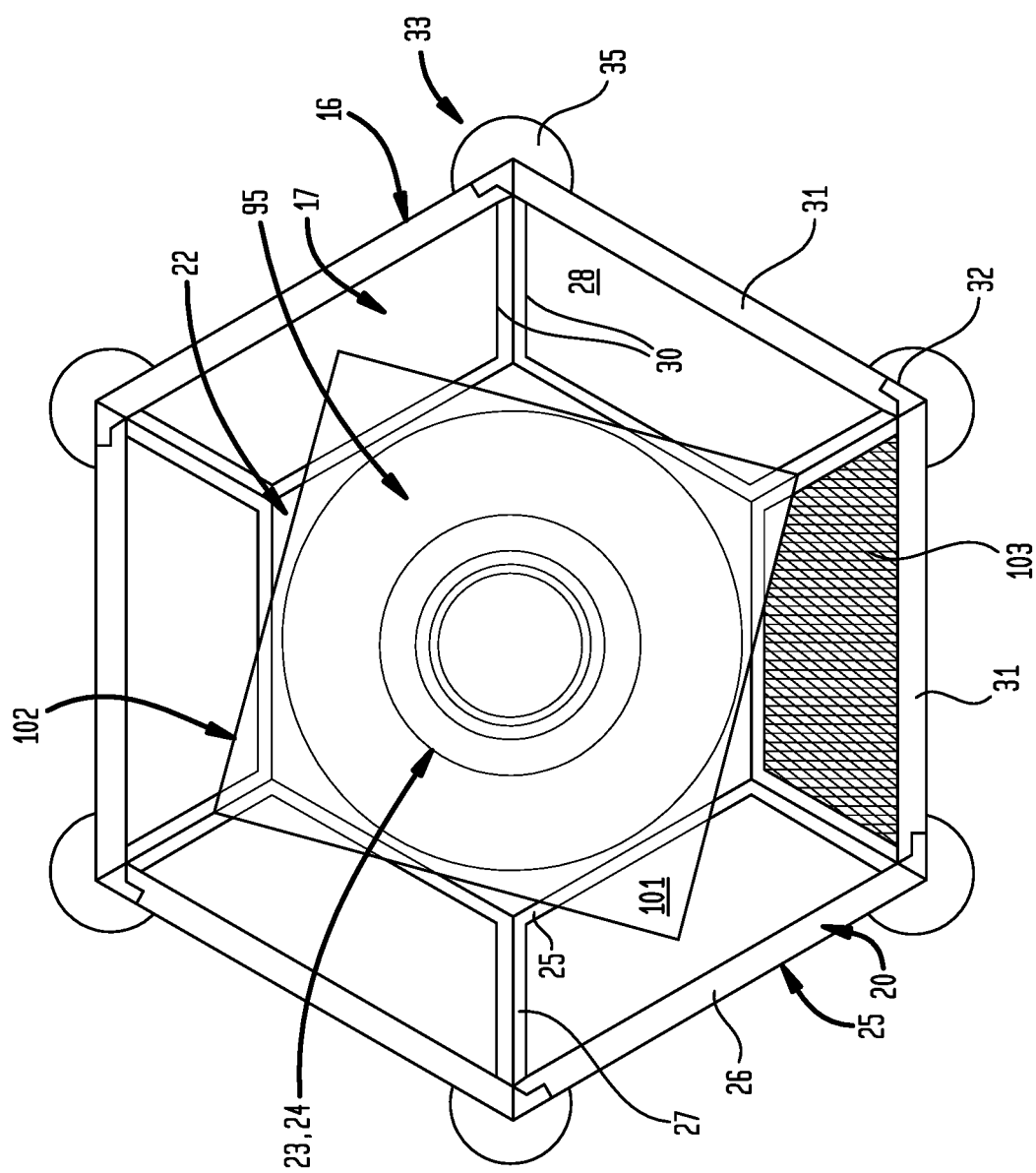
FIG. 8 is top plan view of a particular embodiment of a mobile announcement device.
Figure 9:
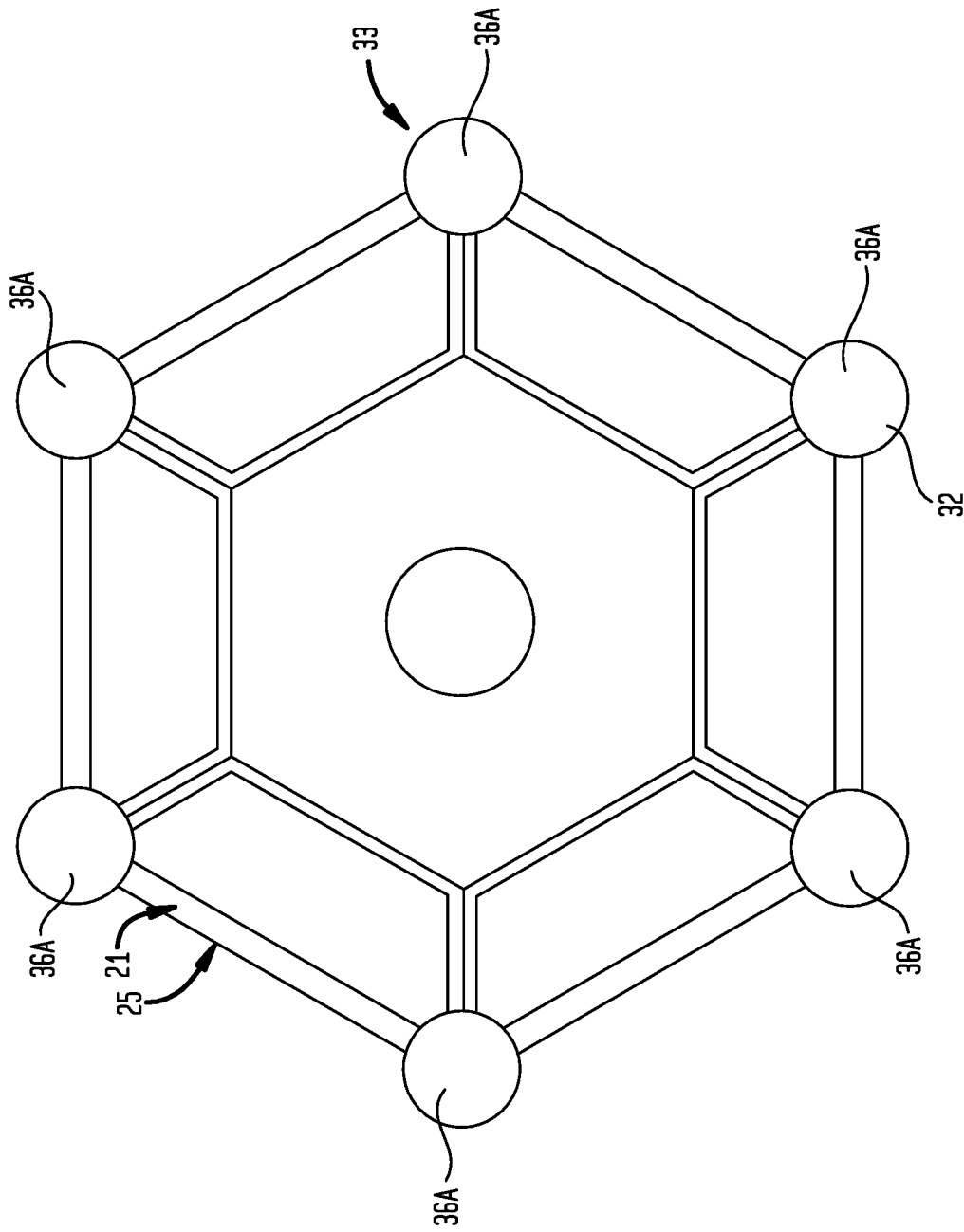
FIG. 9 is bottom plan view of a particular embodiment of a mobile announcement device.
Figure 10:
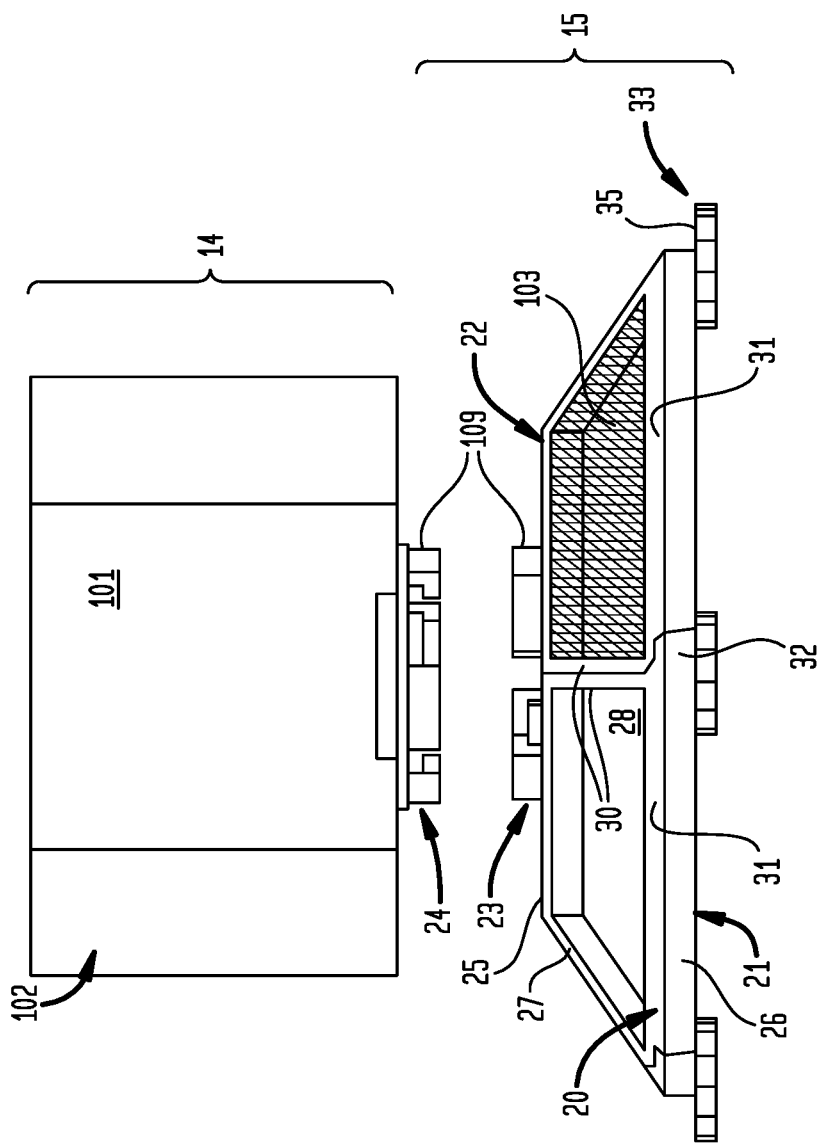
FIG. 10 is left side elevation view of a particular embodiment of a mobile announcement device illustrating a mobile notification device topper removably engageable with a mobile announcement device base unit.
Figure 11:
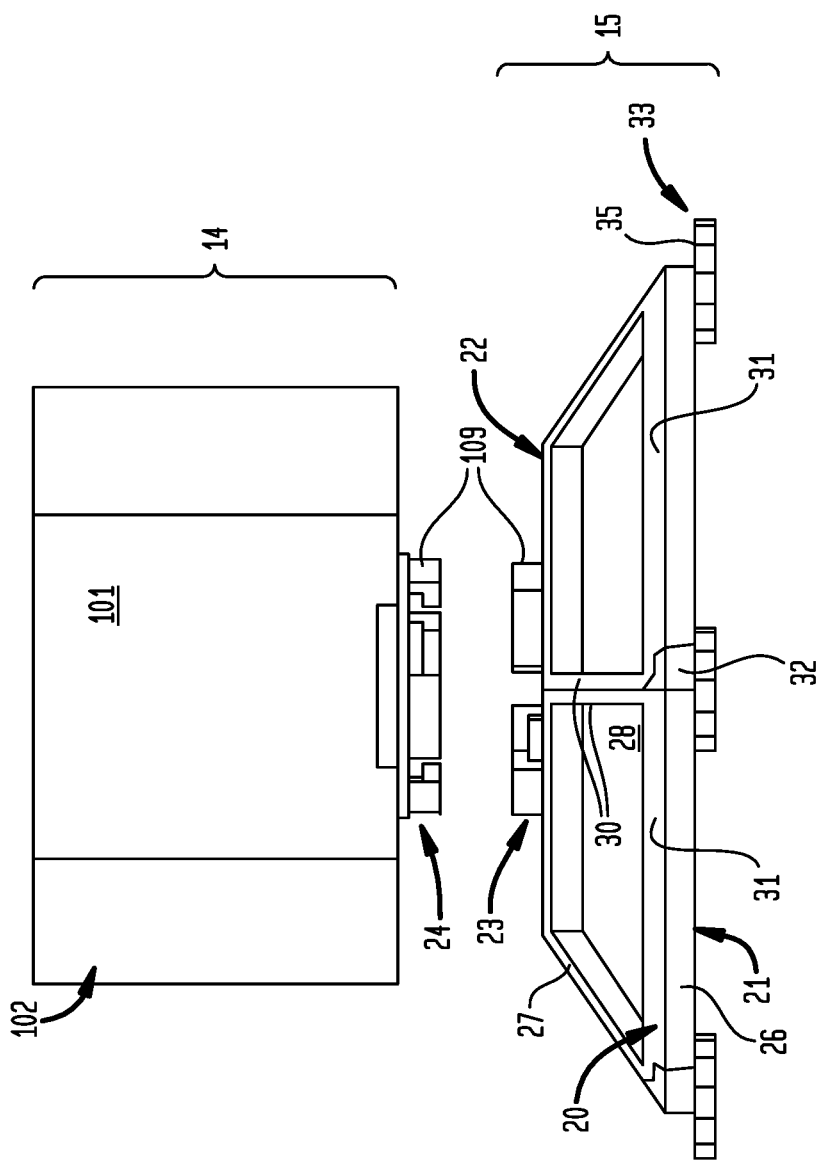
FIG. 11 is right side elevation view of a particular embodiment of a mobile announcement device illustrating a mobile announcement device topper removably engageable with a mobile announcement device base unit.

Now, with primary reference to FIGS. 2 and 3, the support housing (16) can further include a plurality of securement elements (33) configured to allow the base unit (15) to be disposed in fixed or releasably fixed spatial relation to a support surface (29). In particular embodiments, the securement elements (33) can include a fastening element (34) attached to a pad (35). The fastening element (34) can be configured to afford a threaded, interference, or snap fit engagement to the support housing base (21) or can be secured on or into the support housing base (21) by use of an adhesive, spin welding, or can be integrally molded with the support housing sidewall (20), or combinations thereof. In particular embodiments, the pad (35) can include a first magnet (36A) (whether an electromagnet or permanent magnet) for magnetic attachment to ferromagnetic support surfaces (29A), or suction elements, hook or loop material coupled to the pad (35) for mated engagement with the corresponding hook or loop applied to the support surface (29). As shown in the illustrative example the securement elements (33) can be coupled proximate corresponding points of the second polygonal member (26). In particular embodiments, in which the support surface (29) comprises a non-ferromagnetic support surface (29B), a second magnet (36B) can be disposed opposite the first magnet (36A) securing the non-ferromagnetic support surface (29B) between the first and second magnets (36A) (36B).

Again, with primary reference to FIG. 2, in particular embodiments the pad (35) can be replaced by a ring member (37) through which cross bars (38) can pass. The cross bars (38) can be secured to the support surface (29C), such as: a mobile vehicle (truck, car, motorcycle, bicycle, trailer, or the like).

Now, with primary reference to FIGS. 1 through 11, the base unit (15) can further comprise a processor unit (17) including a processor (18) communicatively coupled to a non-transitory computer readable media (19) containing the program (12). In particular embodiments, the program (12) can operate an electronic data exchanger (39) which functions to transmit base unit pairing information (40) to the service provider computing device (4) or the client computing device (3). In particular embodiments, the base unit (15) can further include a radio frequency controller (41) which operates a radio frequency transmitter (42) to cause wireless connection or pairing of the base unit (15) with a service provider computing device (4) or a client computing device (3) over a short-range radio frequency band (43) to carry a signal over all or a part of the communication path between the base unit (15) and the service provider computing device (4) or the client computing device (3). The short-range frequency band (43) can include, as illustrative examples: BLUETOOTH® (44) which operates at frequencies of about 2402 MHz to about 2480 MHz or about 2400 MHz to about 2483.5 MHz or WI-FI® (45) which operates at about 2.4 GHz or 5 GHz. In other particular embodiments, the base unit (15) can, but need not necessarily include, a tone generator (46) which generates tones (47) also referred to as an "audio beacon" that provides a signal over the communication path between the base unit (15) and the service provider computing device (4) or the client computing device (3).

Now, with primary reference to FIG. 1, in particular embodiments, the electronic data exchanger (39) can further operate to transmit a base unit identification code (48) from the base unit (15) to be received by the service provider computing device (4) or the client computing device (3). The base unit identification code (48) can include a string of data which can be correspondingly associated with announcement data (49) held in the server (2) or in the client database (54). The announcement data (49), as illustrative examples, can contain a visual stream data (50) or an audio stream data (51) or combined stream data assembled in a container bit stream (52) such as MP4, FLV, WebM, ASF, ISMA, MOV, AVI, or the like.

Again, with primary reference to FIG. 1, the base unit identification code (48) and the associated data string can identify discrete portions of announcement data (49) contained in the server (2) or an announcement database (54) and include instructions on utilizing those discrete portions of the announcement data (49) to make one or a plurality of announcements (55). For example, the electronic data exchanger (39) can transmit a string of data such as C12.B1.F1.xx1111.1234 where C12 identifies a client computing device (4), and xx1111 can identify or provide announcement data retrieval information (57) of the announcement data (49) and 1234 can identify the announcement conditions (58) to be met to activate an announcement module (59) which functions to retrieve and decode the announcement data (49) and perform the announcement (55). As illustrative examples, announcement conditions (58) can include one or more of: location of the base unit (15) based on one or more location coordinates (60) derived by operation of a global positioning module (61) receiving location coordinate data (62) from a global positioning receiver (10) included in the base unit (15), pre-selected dates (63) or preselected times (64), or combinations thereof.

Again, with primary reference to FIG. 1, in particular embodiments, "B1" in the data string can indicate that the battery (65) has sufficient charge to perform the announcement (55). "R1" in the data string can indicate that the base unit (15) has retrieved the announcement data (49) to perform the announcement (55).

Again, with primary reference to FIG. 1, in particular embodiments, the electronic data exchanger (39) can further operate to transmit an announcement performance notification (66) based on a match of the pre-selected announcement conditions (58) and the current actual base unit conditions (67). In particular embodiments, the base unit (15) can send an announcement performance notification (66) in a string of data, such as, 1.2.3.4.5.6.7.8.9.10.11.12 where the data corresponds to one or more of: announcement performance location (68), announcement performance date (69), or announcement performance time (70) and identify the announcement data (49) which was used in performance of the announcement (55), or combinations thereof. Alternately, an announcement performance notification (66) can correspond to a binary indication (71) that the announce has or has not been performed.

Again, with primary reference to FIG. 1, in particular embodiments, the base unit (15) can further include a global positioning receiver (10) operably coupled to a global positioning system (11) and the base unit processor (18) which executes the global positioning module (61) can calculate location coordinates (60) of the base unit (15). The term "global positioning system (11)", for the purposes of this invention, means a plurality of earth-orbiting satellites (72) each transmitting a satellite positioning signal (73) that by operation of the global positioning module (61) results in determination of the location coordinates (60) of the base unit (15)(or the client computing device (3) or the service provider computing device (4)), including one or more of: a longitude (74), a latitude (75) or altitude (76) of the global positioning signal receiver (10) within the base unit (15) (or the client computing device (3) or the service provider computing device (4)) which may be shared with the service provider computing device (3) or the client computing device (4).

Again, with primary reference to FIG. 1, in particular embodiments, the global positioning module (61) of the program (12), based on general movement of the base unit (15) or occurrence of the base unit (15) at or in proximity to pre-selected location coordinates (77), can be executed to pair or communicate with the service provider computing device (4) or the client computing device (3) to send the location coordinates (60) of the base unit (15) which can be further processed by a map module (78) to provide a location indicator (79) overlaid in a two or three dimension map (80) (as one example, Google® Maps). In particular embodiments, based on the location coordinates (60) of the base unit (15), the client computing device (3) or the service provider computing device (4) can by user command (81) of the client user (82) or the service provider user (83) activate the base unit (15) to process particular announcement data (49) and perform the announcement (55).

Again, with primary reference to FIG. 1, the location coordinates (60) can be further applied by the global positioning module (61) as a global positioning reference (84) to implement an unlocked condition (85) of the base unit (15) allowing performance of the announcement (55) or implements the locked condition (86) of the base unit (15) to preclude performance of the announcement (55). The determination of whether to implement the locked condition (86) or the unlocked condition (85) of the base unit (15) can be based on a matching table (87) in which pre-selected location coordinates (77) are matched to the locked condition (86) or the unlocked condition (85) whether in regard to all announcement data (49) or only as to particular types, kinds, or particular ones of announcement data (49). For example, in particular jurisdictions or geographic areas having boundaries defined by interconnected location coordinates (60) audio announcements (55A) may be unlawful during certain dates and times. Accordingly, the pre-selected location coordinates (77) within the bounded areas can as to audio announcement data (51) afford the locked condition (86) of the base unit (15), whereby, location coordinates (60) received by the GPS receiver (10) in the base unit (15) which match those pre-selected location coordinates (77) cause the locked condition (86) of the base unit (15) precluding any audio announcement (55A), but causes the unlocked condition for performance of visual announcements (55B). As another example, determination of the locked condition (86) or the unlocked condition (85) of the base unit (15) can be based on determined movement or non-movement of the base unit (15) including factors such as: speed, acceleration, velocity, travel pattern, travel route, and combinations thereof.

For the purpose of this invention, the term "announcement" means conveying or representing data in or by any entity, form, or arrangement and without limitation to the breadth of the foregoing includes audio announcements or visual announcements, or combinations thereof.

For the purposes of this invention, the term "audio announcement" means generation by any mechanism or method of acoustic, mechanical, or electrical frequencies corresponding to normally audible sound waves including frequencies occurring in the range of about 15 Hertz to about 20,000 Hertz.

For the purposes of this invention, the term "visual announcement" means the depiction, projection or display of visually perceivable objects, materials, elements, or attributes and without limitation to the breadth of the forgoing includes any visual media including as illustrative examples, fixed or moving devices or sculpture, marks, brands, fixed or moving text, illumination of surfaces, still or moving light(s) within the visual spectrum, holograms, still or moving images.

Again, with primary reference to FIG. 1, in particular embodiments, the base unit (15) can further include an illumination element (130) which emits an amount of light (131) to illuminate surfaces of the topper (14) whether incident on the external or internal surfaces of the topper (14).

Now, with primary reference to FIGS. 1 and 2, in particular embodiments, the base unit (15) can further include electromagnet control module (88) which can be activated or deactivated by user command (81) in the service provider computing device (4) to correspondingly activate electromagnets (36A) in the pads (35) of the securement elements (33).

Now, referring primarily to FIG. 1, in particular embodiments, the base unit (15) can further include a power management unit (89) which comprises a microcontroller (90) which governs power functions of the base unit (15) and the topper (14). This microcontroller (90) includes firmware and software held in a memory element, a processor, input/output functions, timers to measure intervals of time, and analog to digital convertors to measure the voltages of the main battery (65) or power source of the base unit (15). The power management unit (89) in coordination with the electronic data exchanger (39) can further operate to transmit the battery status notification (91) to the service provider computing device (4) or the client computing device (3). In particular embodiments, the power management unit (89) can determine battery charge of the battery (65) and activate a battery charging circuit (92). In particular embodiments, the battery charger (93) can be coupled to a power source (93) such as a 12 Volt direct current source (for example, the electrical system of motor vehicle (94)) or can convert or transform 110 Volt alternating current to 12 Volt direct current to charge the battery (65). In particular embodiments, the base unit (15) can further include a solar panel (95) which can generate sufficient current over time to charge the battery (65) or supplement the battery (65) in operating the base unit (15) or features of the topper (14).

Again, with primary reference to FIG. 1, in particular embodiments, the program (12) can further include a media input module (96) which can acquire a live visual stream (97) or a live audio stream (98) generated by respective video recorders (99) or audio recorders (100) (which in particular embodiments can operate as surveillance recorders) within the network (6) and decodes the discrete or combined visual data stream (97) or audio data streams (98) to correspondingly display a visual announcement (55B) in a video display area (101) on the display surface (102) associated with the topper (14) or to generate an audio announcement (55A) via an audio player (103) associated with the base unit (15) or topper (14).

Each of the visual stream data (50) or audio stream data (51), or combined stream data, can be stored as an announcement file (104) in the announcement database (54), the server computer (2), the client computing device (3), the service provider computing device (4), or another network (6) node. The media input module (96) can further function to retrieve from one or more of the server computers (2), the announcement database, a client computing device (3), or service provider computing device (4) an announcement file (104) containing the compressed visual announcement (55A) or audio announcement (55B). The term "media file (104)" for the purposes of this invention means any type of file, or a pointer, to visual stream data or audio stream data and without limiting the breadth of the foregoing can be a video file, an audio filed, extensible markup language file, keyhole markup language file, or the like.

Whether the media input module (96) functions during acquisition of a live visual stream (97) or a live audio stream (98) or functions to retrieve announcement files (104), the media input module (96) can utilize a plurality of different parsers (105) to read visual stream data (50), audio stream data (51), or the combined stream data, in any file format or media type. Once the media input module (96) receives the visual stream data (50) or the audio stream data (51), or combined stream data, or opens the announcement file (104), the media input module (96) uses a visual or audio stream decoder (106)(or both) to decode the visual stream data (50) or the audio stream data (51), or the combined stream data.

Again, with primary reference to FIG. 1, the media input module (96) further functions to activate a media presentation module (107) of the program (19) which functions to display the visual announcement (55A) represented by the visual stream data (51), or combined stream data, or the announcement file (104) on the display surface (102) of the topper (14) or operates an audio player (103) associated with the base unit (15) to generate an audio announcement (55B). As an illustrative example, a service provider (4) can by user command (81) in a service provider user interface (108A) (or a client (82) in a client user interface (108B) select video stream data (50) or audio stream data (51), or combinations thereof, accessible through the network (6), which in particular embodiments can include recording of a live video streams (97) or live audio streams (98) which by operation of the program (12), as above described, the live visual stream (97) or the live audio stream (98), or combinations thereof, can be processed and the corresponding live visual announcement (55A) or live audio announcement (55B), or combinations thereof, can be displayed on the display surface (102) of the topper (14) or generated by the audio player (103) associated with the base unit (15) or topper (14). As a second illustrative example, the service provider (4) by user command (81) in the service provider computing device interface (108A) can select an announcement file (104) from a client database (54) including video stream data (50) or audio stream data (51), or a combination thereof, which can be processed by operation of the program (19) as above described, and the corresponding visual announcement (55A) or audio announcement (55B), or combinations thereof, can be displayed on the display surface (102) of the topper (14) or generated by the audio player (103) associated with the base unit (15) or topper (14). As a third illustrative example, a service provider (4) by user command (81) in the service provider user interface (108A) can select a first announcement file (104A), such as an video MP4 file, and can further select a second announcement file (104B), such as an audio MP3 file and generate a combined stream data which can be processed by operation of the program (19) as above described and the visual announcement (55A) can be displayed the display surface (102) of the topper (14) and the audio announcement (55B) can be generated by the audio player (103) associated with the base unit (15); each subject to a determined unlocked condition (85) of the base unit (15) relating to the visual stream data (50) or audio stream data (51).

The Topper. Embodiments of the topper (14) can be fixedly engaged to the base unit (15) or can removably engage the base unit (15) to allow a wide variety of topper structures and announcement features to be incorporated into the mobile device announcement system (1). Again, with primary reference to FIGS. 2 through 12, an illustrative example of a topper (14) defines a rectangular volume or a cylindrical volume; however, this is not intended to preclude any structural configurations of the topper (14) that can be fixed to or removably engaged and supported by the base unit (15). Accordingly, the topper (14) can be disposed in the configuration of or to carry the brand identification marks (as an example the trademark of a person, a product or an entity), or can be disposed in a configuration of a person, product or entity (as an example structural configuration of a sports team mascot), or can be disposed in a configuration which carries or integrates display surfaces such as display monitors or screens on which still or moving images or text can be depicted, or the topper (14) can be disposed in a configuration which moves, changes orientation, or interchanges between a plurality of fixed spatial relationship of a plurality of movable surfaces, or can be disposed in a resiliently flexible configuration which moves in relation to applied forces due to pressure, acceleration or change in velocity, or can be disposed as a flexible configuration which can be inflated or deflated to assume corresponding structures and movement between an inflated condition and a deflated condition.

Again, with primary reference to FIGS. 2 through 12, in particular embodiments, the various configurations of the topper (14) can include a second connector (24) having a configuration common to a plurality of toppers (14) which allows interchangeable detachable mating of a wide variety of different configurations of the topper (14) with a first connector (23) coupled to the base unit (15). As shown in the illustrative examples of FIGS. 2 through 11, the first and second connectors (23)(24) include camming surfaces (109) which rotatably engage and cam to induce an interference or friction fit; however, this illustrative example, is not intended to preclude other mateable first and second connectors (23)(24) having other mateable features such as threads, pegs, magnets, hook and loop materials or the like.

Now, with primary reference to FIGS. 1 and 12, the base unit (15) can include a support housing (16) to which the topper (14) removably couples and retains or releasably retains a processor unit (17) including a processor (18) communicatively coupled to a non-transitory computer readable media (19) containing all or a portion of the program (12) and functionalities, as above described. In the illustrative embodiment of FIG. 12, the base unit (15) and topper (14) can provide a dimensionally reduced form factor which can be attached to a supporting surface (29) of a vehicle (94) and in particular embodiments, can have dimensionally reduced form factor to be used in similar fashion to hood ornament on a vehicle (94) which allows the vehicle to be personalized and to make announcements (55)(55A)(55B), as above described. In particular embodiments, the support housing sidewall (20) disposed between the support housing base (21) opposite, or generally coplanar, with a coupler platform (22) including a first connector (23) which detachably mates with a second connector (24) coupled to the topper (14). In this illustrative example, the support housing side wall (20) can afford a substantially continuous unbroken surface disposed between the support housing base (21) and the coupler platform (22) configured as a sphere cap, truncated spheres, truncated cone, or truncated pyramid (three sided, four sided, five sided, six sided truncated pyramids, or a greater number of sides). In particular embodiments the support housing sidewall (20) can be a one-piece support housing sidewall (20).

Again, referring primarily to FIG. 12, the support housing (16) can further include a monolithic securement element (33) configured to allow the base unit (15) to be disposed in fixed or releasably fixed spatial relation to a support surface (29) (94). The securement element (33) can be a magnet (36A) but can take the form of suction elements or other structural forms that allow releasable fixed engagement with the support surface (29) in the form of a vehicle (94).

As above described, the topper (14) can removably engage the base unit (15) to allow a wide variety of topper structures and announcement (55) features to be incorporated into the mobile device announcement system (1). While the illustrative topper (14) of FIG. 12 defines a cylindrical volume, this is not intended to preclude any structural configurations of the topper (14) that can be removably engaged and supported by the base unit (15). Accordingly, the topper (14) can be disposed in the configuration of or to carry the brand identification marks (as an example the trademark of a person, product or entity), or can be disposed in a configuration of a person, product or entity (as an example structural configuration of a sports team brand or mascot), or can be disposed in a configuration which carries or integrates display surfaces such as display monitors or screens on which still or moving images or text can be depicted, or topper can be disposed in a configuration which moves, changes orientation, or interchanges between a plurality of fixed spatial relationship of a plurality of movable surfaces, or can be disposed in a resiliently flexible configuration which moves in relation to applied forces due to acceleration or change in velocity, or can be disposed as a flexible configuration which can be inflated or deflated to assume corresponding structures and movement between an inflated condition and a deflated condition.

Again, referring primarily to FIG. 12, the various configurations of the topper (14) in the dimensionally reduced form factor can include a second connector (24) configuration common to a plurality toppers (14) which allows interchangeable detachable mating of a wide variety of different configurations of the topper (14) with a first connector (23) coupled to the base unit (15), as above described.

The Client Or First Computing Device. Now, with primary reference to FIG. 1, a client computing device (3)(or first computing device) can include a client device processor (110) communicatively coupled to a client device non-transitory computer readable media (111) containing computer executable instructions including in part the program (12) to implement the functionalities of the client computing device (3) in the system (1). The client computing device (3) can as illustrative examples be: a desktop computer device or a mobile computer device, such as, personal computers, slate computers, tablet or pad computers, cellular telephones, personal digital assistants, smartphones, programmable consumer electronics, or combinations thereof. The program (12) accessed or downloaded to the client computing device (3) can allow a client user (82) access to the functionalities of the system (1) whether on-line or off-line depending on the application.

The Service Provider Computing Device. Again, referring primarily to FIG. 1, embodiments of the system (1) can, but need not necessarily, include a service provider computing device (4)(or second computing device). The service provider computing device (4) can include a service provider computing device processor (112) communicatively coupled to a service provider computing device non-transitory computer readable media (113) containing computer executable instructions including in part the program (12) to implement the functionalities of the service provider computing device (4) in the system (1). The service provider computing device (4) can as illustrative examples be: a desktop computer device or a mobile computer device, such as, personal computers, slate computers, tablet or pad computers, cellular telephones, personal digital assistants, smartphones, programmable consumer electronics, or combinations thereof. The program (12) accessed or downloaded to the service provider computing device (4) can allow a service provider (4) access to the functionalities of the system (1) including access to the functionalities of one or more mobile communication devices (5).

The description of a client computing device (3)(first computing device) and a service provider computing device (4)(second computing device) is not intended to preclude a system (1) including a plurality of computing devices and a plurality of mobile announcement devices (5) coordinated to operate in the system (1) by operation of the program (12).

The Announcement Database. In particular embodiments, the program (12) can coordinate access to and retrieval of announcement files (104)(104A)(104B) in an announcement database (54). The term "announcement files (104)" refers one or more media files which include visual data (binary representation of image content, such as, video data, pictorial data, text data, MP4 files, or other data which can be decoded to depict image content on a display surface) or audio data (binary representation of sound, such as MP 3 files, which can be decoded to generate audio from speaker or other sound generator). As an illustrative example, a client user (82) might be an individual or a business entity (whether a manufacturing, a distribution, a retail, a service, or other entity) having announcement files (104) retrievably stored in a client database (54). By operation of the program (19), the announcement files (104) can be retrieved and the video stream data (50) can be decoded for depiction on a display surface (102) carried by the mobile announcement device topper (14) or the audio stream data (51) can be decoded to be played through audio player (103) carried by the mobile announcement device base (15) or topper (14).

Client-Service Provider Identification Application. Again, with general reference to FIGS. 1 through 12, and with primary reference to FIG. 1, particular embodiments of the mobile announcement system (1) can, but need not necessarily, include an identification application (114) supported by the network (6) and accessible by browser based on-line processing or downloadable by the client computing device (3) or the service provider computing device (4). The identification application (114) coordinates communication between one or more client computing devices (3) and one or more service provider computing devices (4) (also respectively referred to as a "requesting computing device (3)" and an "answering computing device (4)" outside of the client-service provider relationship) to establish limited on-line or off-line wired or wireless control between the requesting computing device (3) and the answering computing device (4) to verify the identity of a client user (82) or a service provider user (83) (or between first and second users outside of the client-service provider relationship) prior to face to face interaction between the client user (82) and the service provider user (83); or to verify identity of mobile objects, such as, vehicles; or stationary objects or structures, such as, businesses, homes, tents, or geographic destinations. The identification application (114) includes functionalities to provide personal security by identifying one or both of a client user (82) or service provider (83) (or more generally between a first user and second user) to the other by operation of the client user's (82) or service provider's mobile announcement device (5) prior to face-to-face interaction.

The term "service provider (83)" in the context of the identification application (114), means any organization, business or individual which offers a service that involves in person interaction or meetings and without sacrificing the breadth of the foregoing, includes as illustrative examples, ride sharing services such as Uber® or Lyft®, dating services such as Match® or eHarmony®, home health care services, event planning services, day care services, and courier delivery services.

The term "client user (82)" in the context of the identification application (114), means any person receiving service from a service provider involving in person interaction or meetings and without sacrificing the breadth of the foregoing includes ride share passengers, dating services daters, delivery service recipients, home health care service recipients, and event planning service attendees.

The term "mobile announcement device" in the context of the identification application (114) can include the above described embodiments of the mobile announcement device topper (14) and mobile announcement device base unit (15), but can further include any form factor visible to client user (82) or service provider (83) capable of providing the visual announcement (55A) or audio announcement (55B), or a combinations thereof and without sacrificing the breadth of the foregoing can include the client user's or service provider's computing device (3)(4); jewelry, such as: watches, rings, pins, necklaces, bracelets, hat ornaments, breastpin, brooches, buttons; badges or name tags; key fobs, tokens, and combinations thereof.

Again, with primary reference to FIG. 1, the identification application (114) can be executed to depict or provide an identification request element (115) on the requesting computing device (3) user interface (108B) which by interaction can transmit an identification request (116) to the answering computing device (4). In particular embodiments, the identification request (116) can include one or more of an address or pairing information of the requesting computing device (3) (or intermediate server, data center network node which can act to forward the request (116)), a security code (117), client identifying data (118), and a service provider identifying data inquiry (119).

In particular embodiments, the identification application (114) can function to couple the security code (117) to the identification request (116). The security code (117) can comprise pre-selected or randomly generated visual indicia and without sacrificing the breadth of the foregoing can include symbols, characters, numbers, letters, images, colors, audible sounds or combinations thereof. The security code (117) can be reproduced or displayed as an announcement (55) by the mobile announcement device (5) associated with the answering computing device (4) or service provider (83) to allow the requesting computing device (3) or client user (82) to identify the answering computing device (4) or service provider (83).

In particular embodiments, the identification application (114) can further function to couple client identifying data (118) to the identification request (116). The client identifying data (118) can comprise one more indicia that the service provider (83) can utilize to identify the client user (82) and without sacrificing the breadth of the foregoing can include one or more of the client name, client image, client clothing, or accessory item associated with the client user (82), or global positioning system location coordinates of the requesting computing device (3).

In particular embodiments, the identification application (114) can further function to couple a service provider identifying data inquiry (119) to the identification request (116) which allows the service provider (83) to attach service provider identifying data (121) in an identification answer (120) to the inquiry (119) which can then be retrieved by the identification application (114) to provide the client user (82) with the service provider identifying data (121). The service provider identifying data (121) can comprise one or more indicia that the client user (82) can utilize to identify the service provider (83) and without sacrificing the breadth of the foregoing can include the service provider's name, service provider image, global positioning system location coordinates of the service provider computing device, service provider clothing, or accessory item or device.

In particular embodiments, the identification application (114) can be executed to depict or provide an identification answer element (122) on the answering computing device user interface (108A) which by interaction can transmit an identification answer (120) to the identification request (116) of the requesting computing device (3). In particular embodiments, the identification answer (120) can include one or more of an address or pairing information of the requesting computing device (3) (or intermediate server, data center network node) which can act to forward the identification answer (120) to the requesting computing device (3), a verifying receipt (123) of the identification request (114), and the service provider identifying data (121).

In particular embodiments, the identification application (114) can further include a computing device controller (124) which allows limited control by the requesting computing device (3) over the answering computing device (4)(or vice versa) or the associated mobile announcement device (5) by analyzing which permissions (126) are required to access the requesting or answering computing device (3)(4) or mobile announcement device (5) hardware and applications, whether the permissions (126) were pre-selected by the client user (82) or service provider user (83), or automatically by the computing device controller (124) to deliver the corresponding identification request (114) or identification answer (120) including, the content of the coupled security code (117), client identifying data (118) or the service provider identifying data (121).

As one illustrative example of limiting control by the computing device controller (124), if the identification request (116) includes a security code (117) that only includes an audio annotation (55A), then the computing device controller (124) may only provide permissions (126) to access the functionalities of the requesting computing device (3) or answering computing device (4) and the associated mobile announcement devices (5) to reproduce the audio annotation (55A) included in the security code (117).

As a second illustrative example, if the identification answer (120) includes service provider identifying data (121) having only global positioning coordinates (60), the computing device controller (124) may only provide permissions (126) to the requesting computing device (3) to receive the global positioning coordinates (60), retrieve and display the relevant maps (80) from a remote server (2), and open navigation and route planning tools (125) to allow the client user (82) to identify the location of the service provider (83).

As a third illustrative example, the computing device controller (124) can function to limit a permissions time period (127) in which the identification request (116) and identification answer (120) are maintained in the respective requesting computing device (3) or answering computer device (4).

As a fourth illustrative example, the computing device controller (124) can limit the use of the identification request (116) and the identification answer (120) and the associated data only when the requesting computing device (3) and the answering computing device (4) are within a permissions distance (128). For example, if the security code (117) or identifying data (118)(121) includes only audio announcements (55A), then the permissions (126) granted to reproduce the audio announcement (55A) may only allow operation when the requesting computing device (3) and the answering computing device (4) are within close proximity, such as ten to twenty feet.

These illustrative examples are not intended to preclude embodiments which limit control of different functionalities of the requesting computer device (3) or the answering computing device (4) in the same, similar or different manner; but rather, it is to be understood that each one or the plurality of functionalities of a requesting computer device (3) or an answering computing device (4) can be delimited by operation of the computing device controller (124) to a permissions distance (128), a permissions time period (127) or matched to one or more permissions properties or characteristics (129) the identification request (116) or the identification answer (120) including frequency, amplitude, intensity, duration or other characteristics of the content of the identification request (116) or identification answer (120), or combinations thereof.

The computing device controller (124) provides the advantage of limiting access to the applications, functionalities and databases of the requesting computing device (3) or answering computing devices (4) to those applications, functionalities and databases required to receive an identification request (116) or an identification answer (120) which reduces the risk of receiving deceptive, confusing, or ambiguous data from the requesting computing device (3) or the answering computing device (4) or from sources outside of the requesting computing device (3) or the answering computing device (4).

Again, with primary reference to FIG. 1, an illustrative method of using the client-service provider identification application (114) can include interacting with the identification request element (115) on the requesting computing device (3) thereby sending an identification request (116), directly or indirectly through the network (6), to an answering computing device (4), the identification request (115) including one or more of the security code (117), the client identifying data (118), permissions (126) for limited control of the answering computing device (4) and the associated mobile announcement device (5).

The method can further include processing the request by the answering computing device (4) including one or more of storing the security code (117), the client identifying data (118), and permissions (126) for limited control of the answering computing device (4) and the associated mobile announcement device (5) by the requesting computing device (3) to allow the client user (82) to identify the answering computing device (4) or the service provider (83) (or other relationship between persons or objects) by reproduction or display of the security code (116) by limited access operation of the answering computing device (4) or the associated mobile announcement device (5).

The method can further include reproducing or displaying the security code (116) or client identifying data (118) included in the identification request (116) by the answering computing device (4) or associated mobile announcement device (5) based on permissions (126) granted by the computing device controller (124) to identify the service provider (83) associated with the answering computing device (4) and mobile announcement device (5).

The method can further include reproducing or displaying the service provider identifying data (121) included in the identification answer (120) by the requesting computing device (3) or associated mobile announcement device (5) based on permissions (126) granted by the computing device controller (124) to identify the client user (82) associated with the requesting computing device (3) and mobile announcement device (5).

While the above description and illustrative examples may associate the requesting computing device (3) with the client user (82) and the answering computing device (4) with the service provider (83); this is not intended to preclude the service provider (83) from initiating the identification request (116) and the client user (82) replying with the identification answer (120). In particular embodiments, the use of the terms requesting computing device (3) and the answering computing device (4) are not meant to be limited by the context of a client-service provider relationship and the identification application (114) can be utilized in the context of two or more users to correspondingly verify the identity of individuals prior to face-to-face interaction.

As can be easily understood from the foregoing, the basic concepts of the present invention may be embodied in a variety of ways. The invention involves numerous and varied embodiments of a mobile announcement system (1) and methods for making and using such mobile announcement system (1) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "browser" should be understood to encompass disclosure of the act of "browsing"—whether explicitly discussed or not—and, conversely, were there effectively disclosure of the act of "browsing", such a disclosure should be understood to encompass disclosure of a "browser" and even a "means for browsing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the mountable carriers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A system, comprising:
a server having a non-transitory computer readable memory containing an announcement program;
a plurality of computing devices communicatively coupled to said server through a wireless network to access said announcement program, said program executable to:
transmit an identification request from a first computing device to a second computing device, said identification request including a security code, first computing device identifying data, and a second computing device identifying data inquiry, wherein said first computing device identifying data comprises presentation of indicia by said second device which allows a second user of said second computing device to identify a first user of said first computing device;
transmit an identification answer to said first of said plurality of computing devices verifying receipt of said identification request by said second computing device, wherein said identification answer comprises said second computing identifying data, wherein said second computing device identifying data comprises presentation of indicia by said first device which allows said first user of said first computing device to identify said second user of said second computing device,
record said second computing device permissions delimiting control of said second computing device by said first computing device,
record said first computing device permissions delimiting control of said first computing device by said second computing device, wherein said first or said second computing device permissions delimit a time period in which said first computing device or said second computing device respectively maintains said identification request or said identification answer; and
announce said security code by operation of said second computing device or an announcement device communicatively coupled to said second computing device to allow said first user associated with said first computing device to identify said second user associated with said second computing device.

2. The system of claim 1, wherein said security code includes visual announcement data, audio announcement data, or tactile announcement data, and combinations thereof.

3. The system of claim 2, wherein said presentation of indicia by said second device includes visual indicia, audio indicia, tactile indicia, global position system location coordinates of said first computing device, and combinations thereof.

4. The system of claim 3, wherein said presentation of indicia by said first device includes visual indicia, audio indicia, tactile indicia, global position system location coordinates of said second computing device, and combinations thereof.

5. The system of claim 4, wherein said program further executable to present an identification request element on said first computing device which by first user interaction causes transmission of said identification request from said first computing device to said second computing device.

6. The system of claim 5, wherein said program further executable to present an identification answer element on said second computing device which by second user interaction causes transmission of said identification answer from said second computing device to said first computing device.

7. The system of claim 6, wherein said first or said second computing device permissions delimit a distance range between said first and second computing device in which said first or second computing device respectively present first and second computing device identification data.

8. The system of claim 7, wherein said second computing device permissions delimit control of said second computing device by said first computing device to present one or more of video announcements, audio announcements, or tactile announcements contained in said security code.

9. The system of claim 8, wherein said first computing device permissions delimit control of said first computing device by said second computing device to receive second computing device identifying data including only global position system location coordinates of said second computing device or said mobile announcement device.

10. The system of claim 9, wherein said second computing device permissions delimit control of said second computing device by said first computing device to receive only first computing device identifying data including global position system location coordinates of said first computing device.

11. The system of claim 10, wherein said program further executable to control said second computing device or said associated mobile announcement device by said first computing device delimited by said second computing device permissions.

12. The system of claim 11, wherein said program further executable to control said first computing device by said second computing device delimited by said first computing device permissions.

* * * * *